Dec. 6, 1955  J. W. DELAPLAINE  2,726,121
APPARATUS FOR PNEUMATIC ELEVATION OF GRANULAR SOLIDS
Filed Sept. 9, 1950
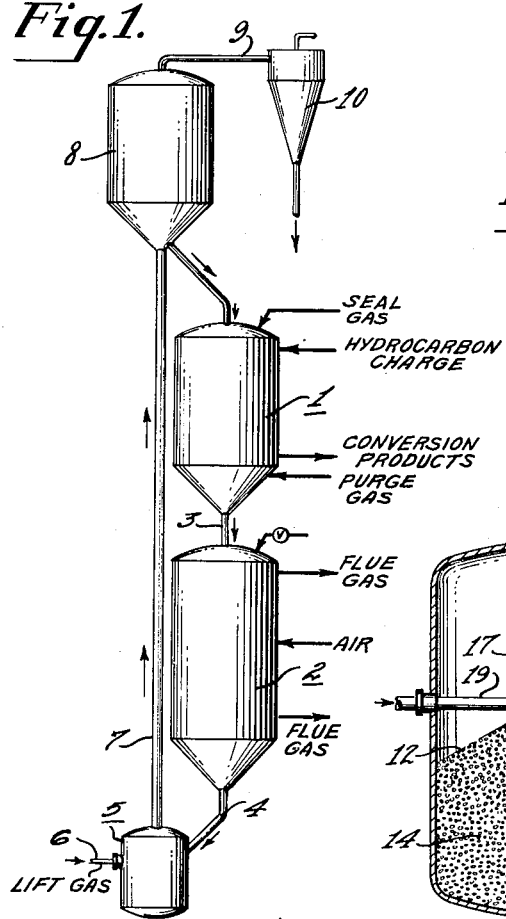
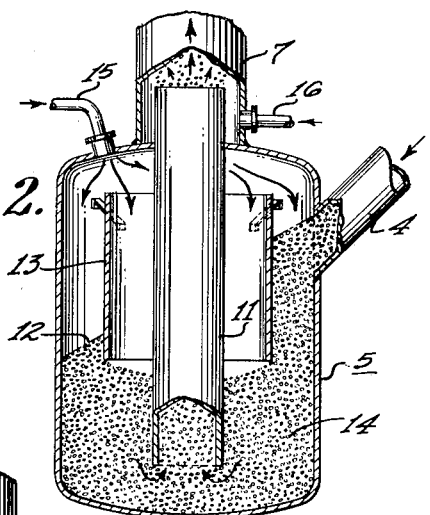
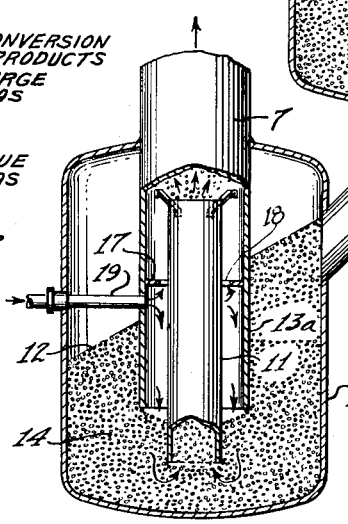
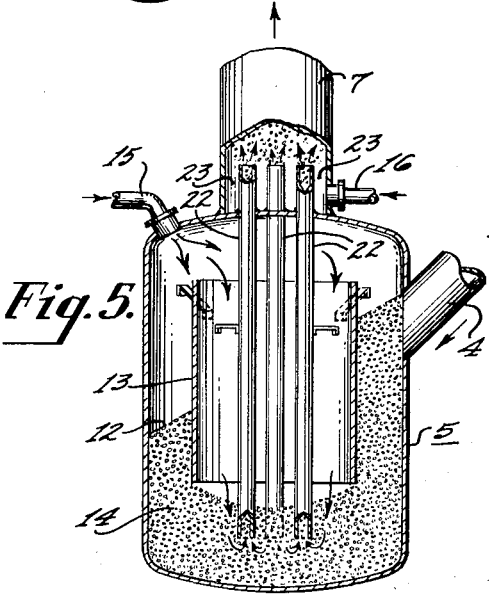
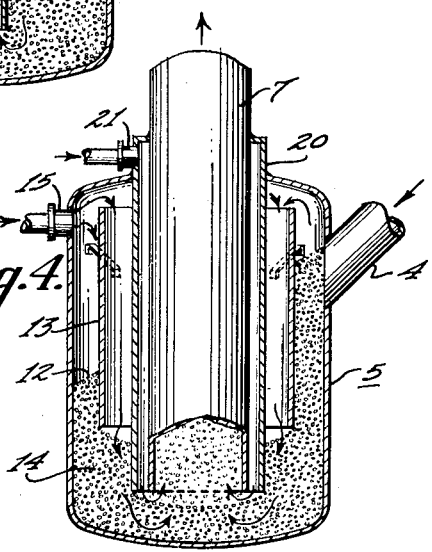
INVENTOR
John W. Delaplaine
BY
ATTORNEY

United States Patent Office 2,726,121
Patented Dec. 6, 1955

2,726,121

APPARATUS FOR PNEUMATIC ELEVATION OF GRANULAR SOLIDS

John W. Delaplaine, Swarthmore, Pa., assignor to Houdry Process Corporation, Wilmington, Del., a corporation of Delaware Application September 9, 1950, Serial No. 183,979

7 Claims. (Cl. 302—53)

The present invention relates to improvements in method and means for transfer and circulation of solid granular material of discrete particle size. The invention finds its most important application in connection with systems wherein catalyst or other contact mass in granular form and of comparatively large particle size, subject to attrition by impact and friction, is continuously circulated to and from a reaction zone and is elevated from a lower to a higher level through a substantial height during the course of such circulation. Familiar examples of such systems are those employed in hydrocarbon conversion processes.

In moving catalyst systems, the catalyst is continuously passed through the hydrocarbon conversion zone and the resulting coke-containing catalyst discharged therefrom is transferred to a separate vessel or zone for regeneration. Since in the usual moving catalyst systems of this type, the catalyst during its course of circulation passes downwardly from a higher to a lower level, it is necessary to return the catalyst to the upper level for repetition of the cycle of operations. While earlier commercial installations employed mechanical means, such as bucket elevators, for transporting the catalyst to the required elevation, in more recent designs elevation of the catalyst is effected in a pneumatic lift. (See "Houdriflow: New design in catalytic cracking," Oil and Gas Journal, January 13, 1949, at page 78.)

Although the systems for circulating solid granular contact mass are described herein particularly with reference to the requirements of the oil refining industries, it is apparent that these have a wider range of usefulness. In general, the granular contact material may be a porous or fused solid and may comprise or consist of a catalytically active or catalytically inert material, the latter being used for heat exchange or for adsorption or fractionation of gases. The granular contact material is advantageously in the form of relatively large particles or granules such as molded pellets in cylindrical or other shapes or formed spherical or spheroidal masses, ranging in size from about 0.05 to 0.5 inch in major diameter. The contact mass during circulation in the system gravitates through processing zones as compact non-turbulent beds in a manner known to the art.

Although pneumatic elevation of catalyst or other contact mass may be used in connection with hydrocarbon conversion systems wherein the hydrocarbon conversion reactor and the regenerating kiln are located side by side, the favored arrangement is one in which the reaction and regeneration vessels or zones are superimposed in line with one another, requiring elevation of the contact mass only once during a cycle of operations. It has been proposed in such systems to arrange the lift pipe through which the contact mass is elevated, so that it passes concentrically through the processing vessels (such as the reactor and kiln), and the contact mass descends as a compact bed surrounding the lift pipe. Such arrangement, however, involves complicated and expensive construction details, particularly with respect to the design and support of internal parts of the processing vessels and adds considerably to the problem of proper sealing against passage of incompatible gases between such vessels. Arrangements are therefore preferred wherein the lift pipe is located externally of the processing vessels. The present invention is especially concerned with systems of the latter type.

In typical systems, to which the invention relates, catalyst or other granular contact mass is discharged by gravity from the lowermost processing vessel, generally from a regenerating zone, to a lift engager or supply hopper communicating with an upright transporting conduit or lift pipe. Lift gas is supplied to the hopper under conditions effecting elevation of the contact mass into the mouth or inlet of the lift pipe for pneumatic transportation therethrough to a required point of discharge. The pattern of flow of such contact material into the lift pipe and flow conditions prevailing particularly in the bottom of the lift pipe, including the velocity and concentration of the contact mass therein, depend upon the manner in which the gas is brought into contact with the granular material in the engager and at the mouth of the lift and the relative pressure and quantity of the gas so employed.

In my copending application Serial No. 128,363 of November 19, 1949, there is described a lift system wherein lift gas is introduced into the lift engager or hopper as a confined annular stream surrounding the lift pipe. This stream passes downwardly into the bed of contact mass below the lift pipe and then passes upwardly into the lift pipe together with contact mass picked up thereby in the path of the gas. Control of circulation rate is afforded by regulating the volume of the lift gas and/or by varying the vertical spacing between the bottom of the lift pipe and the bottom of the concentric sleeve forming the outer boundary for the confined annular stream of gas.

In a copending application of William W. Weinrich, Serial No. 168,818, filed June 17, 1950, now Patent No. 2,699,363, January 11, 1955, a related system is described wherein further control of solids flow rate is provided by flowing controlled minor quantities of additional gas laterally through bed of solids under the lift pipe, such additional gas being introduced initially at the top of the bed of granular solids in the engager hopper or at some intermediate point in the path of solids flow toward the lift inlet. In this manner a sensitive process control of the solids flow rate is obtained. In the said application the gas passed laterally through the bed of contact mass or that passed downwardly and laterally through such bed, is in minor amount and the major portion of the lifting gas is introduced in some other manner into the engager for elevation of the catalyst therein.

In accordance with the present invention granular catalyst or other granular contact mass is continuously supplied during the course of its circulation to the bottom lift hopper or engager forming a continuously replenished bed therein maintained during operation at a substantially constant bed level; one or more lift pipes forming the bottom of the lift path are submerged in the contact mass. All or a major portion of the lifting gas is supplied at the top of a fairly wide layer of catalyst surrounding the lift path and under conditions such that equal distribution of gas and contact mass to all portions of the lift path are obtained.

By operating in this manner a uniform and desirable flow pattern of contact mass entering the mouth of the lift is obtained, such that certain factors contributing to attrition at the lift inlet are eliminated or substantially reduced. Moreover, the contact mass can enter the lift path in highly concentrated state as up to a concentration of 80 to 90% of the settled bulk density of such mass, thus reducing any tendency to swirling, excessive lateral flow, and factors that may cause turbulence at the inlet of the lift.

The flow pattern of the contact mass into the mouth of the lift path is approximately as pictured in Fig. 2. It will be noted that the contact mass is quite uniformly distributed over the cross section of the bottom portion of the lift path immediately above the lift entrance and is substantially free from tendency for concentration of contact mass about the longitudinal center of lift pipe, and there is no large air space formed around the inner wall of the lift pipe near the bottom thereof. Both gas and catalyst are thus substantially uniformly distributed over the lateral cross section of the lift path just above the inlet thereto.

The bottom of the lift path may be a single pipe or a plurality of narrow parallel pipes uniformly spaced and arranged in a circular pattern. The pipe or pipes forming the bottom of the lift path may be continued upwardly for a considerable height to discharge into a gas-disengaging vessel at the top of the upflow path; or such pipe or pipes may be relatively short feeders discharging into a larger principal lift pipe, as more particularly described in copending application Serial No. 170,874.

In the preferred practical embodiment of the present invention, the lift path is located externally of and substantially parallel to the axis of the processing vessels on the downflow side of the system, and the contact mass discharges into the lift engager hopper through a conduit, which may also operate as a seal leg, entering a side wall of the hopper. This arrangement ordinarily results in the formation of a bed of granular material in the lift hopper which due to the natural angle of repose of the contact mass, forms an upper bed surface sloping downwardly away from the point of admission of the contact mass to the opposite side of the hopper. Accordingly, if gas is passed through the top of such a bed downwardly towards the inlet to the lift path, the gas will be proportioned in accordance with the depth of bed encountered; that is a larger portion of the gas will pass downwardly through that part of the bed more remote from the point of solids inlet into the hopper. Such condition results in an unequal distribution of gas around the periphery of the lift path and also a non-uniform supply of contact mass at points around the periphery of the lift path, leading to an erratic and non-uniform flow pattern. This is overcome in practice of the present invention by providing adjacent to the lower end of the lift path a barrier spaced at a sufficient distance from and surrounding the lift path, and terminating at a suitable height (hereinafter explained) above the bottom of the lift path. In this manner there is provided contiguous to and surrounding the lift path inlet a symmetrical layer of contact mass having a uniform mean depth, through which the lift gas may be passed towards the inlet of the lift path. Where the lift path is constituted by a plurality of lift pipes or feeder pipes arranged in a circular pattern the barrier is located concentric to the circle circumscribing the pattern of such pipes.

Other purposes and advantages of the invention and the details of the operation thereof will be understood from the description which follows read in connection with the accompanying drawings illustrating several forms of apparatus adapted for the practice thereof, particularly as applied to hydrocarbon conversion systems. In these drawings:

Figure 1 is a largely schematic view in elevation of a typical system wherein the features of the invention may be applied in practice;

Figures 2–5 are enlarged cross sectional views (partly in elevation) of various modifications of the engager hopper and the bottom of the lift.

An important application of pneumatic lifting of granular materials is in systems for the catalytic cracking or other catalytic conversion of hydrocarbons and the description which follows will accordingly be directed to the circulation of catalyst in such a system.

Referring now to Figure 1, there is shown a catalytic hydrocarbon conversion reactor 1 located above a regenerating kiln 2, and in solids flow communication therewith through a seal leg or conduit 3. In the operation of the illustrated system catalyst enters the top of the reactor 1 and descends therethrough as a compact moving bed. A heated charge of vaporized hydrocarbons, which may include also hydrocarbons in liquid state if desired, is passed through the reactor in contact with the descending bed of catalyst therein under conversion conditions resulting in the formation of desired conversion products in vapor state, which products are disengaged from the catalyst and separately discharged from the reactor. As a result of the conversion reaction, a carbonaceous or hydrocarbonaceous deposit called "coke" is formed, and is deposited in the catalyst. The thus contaminated catalyst is discharged from the bottom of the reactor into the top of a regenerating zone or kiln 2 wherein it is brought into contact with air or other oxygen-containing gas effecting combustion of the coke, and the regenerated catalyst is discharged from the bottom of the kiln for further use in the reactor and repetition of the described cycle. The burning of the coke in the kiln results in the formation of gaseous combustion products which are separately discharged from the kiln as flue gas.

In the illustrated system the freshly regenerated catalyst is discharged from the bottom of the kiln through a conduit 4 into a supply hopper 5 constituting the lift gas engager for the lift. Lift gas is supplied to the hopper by a suitable gas duct 6 under pressure and in controlled quantity to effect lifting of the catalyst from the hopper into the lift pipe 7 communicating with the hopper.

As gaseous lifting medium there may be employed an inert gas supplied from an external source or any gas or vapor that can be processed as charge in the hydrocarbon conversion system, or a gas or vapor derived as effluent from the hydrocarbon conversion reactor or from the kiln. If necessary, to prevent admixture of lift gas with gases in the lowermost part of the kiln, suitable provision may be made for sealing against flow of gases between these vessels in the conduit 4.

The catalyst elevated into the lift pipe 7 is transported therethrough by the lift gas and discharged into a disengager vessel 8, wherein as a result of the increased cross section of the upflow path the catalyst is disengaged and settles out from the influence of the lift gas. The gas is then withdrawn overhead through a line 9 and the catalyst separately discharged from the bottom of the disengager by a solids flow conduit communicating with the top of the hydrocarbon conversion reactor. A cyclone or other form of separator may be provided in the line 9 for separation of fines from the gas.

In the embodiment illustrated in Figure 2, the lift pipe 7 is supplied with catalyst from the hopper 5 by means of a feeder pipe 11. The catalyst is discharged into the hopper 5 by the conduit 4 through a side wall of the hopper and assumes a normal angle of repose in the hopper such that the upper surface of the bed of catalyst therein, as indicated at 12, slopes downwardly from its point of admission to the hopper towards the opposite side. In order to provide uniform supply of catalyst and gas to the feeder pipe 11, a barrier 13 is arranged in the hopper, spaced from the periphery of the feeder pipe and concentrically surrounding the same. This barrier extends from a level above the height of the bed of catalyst at the inlet side of the hopper to prevent spilling of catalyst over the barrier. The bottom of the barrier terminates at a distance above the bottom of the feeder pipe 11 such that the bottom of the feeder pipe will at all times be submerged in a layer of catalyst below the barrier. The catalyst entering the hopper 5 is thus caused to flow around the barrier, leaving a solids free space between the barrier and the periphery of the feeder pipe. At the lower end of the barrier 13 the catalyst flows inwardly toward the periphery of the feeder pipe and assumes an angle of repose to provide a layer having an inwardly sloping symmetrical surface 14 intersecting the feeder pipe at a point above the bottom thereof, the median distance from that surface to the bottom of the feeder pipe being equal at all points around the periphery of the feeder pipe.

Lift gas is admitted to the hopper 5 through an inlet 15 above the catalyst level 12. The major portion of the gas admitted will pass downwardly through the annular space between the feeder pipe 11 and the barrier 13, passing through the frusto-conical surface 14 into the bed therebelow to a level below the mouth of the feeder pipe 11, then reverse direction and pass upwardly into the feeder pipe together with catalyst which will be picked up and carried into the feeder pipe 11 by the gas. A small portion of the gas admitted through inlet 15 may also flow into the catalyst bed externally of the barrier 13 between the outer periphery of the barrier and the inner periphery of the wall of hopper 5. Since such gas encounters a path of greater resistance, the amount thereof will be considerably less than that passing through the surface 14, and will create no serious difficulty with respect to uniformity and control of the lifting operation.

The feeder pipe 11 discharges into the principal lift pipe 7 which is of greater cross sectional area than the feeder pipe. As explained in greater detail in copending application Serial No. 170,874, herein before referred to, such arrangement favors the maintenance of smooth straight line flow in the lower portion of the lift path even when the principal lift conduit is of fairly large diameter. Additional lift gas is supplied to the lift pipe 7 through a separate inlet 16 below the discharge outlet of the feeder pipe 11, so that the additional gas engages the catalyst discharged from the feeder pipe that is already moving positively upward in desired flow pattern. Such additional lift gas may be supplied at much lower pressure, if desired, than that admitted through the inlet 15.

A modified arrangement of feeder pipe and principal lift conduit is illustrated in Figure 3. In this modified embodiment, the barrier 13a is formed by an extension of the lift pipe 7 into the hopper 5. A circular plate 17 is arranged in the annular space between the barrier 13a and the periphery of the feeder pipe 11 provided with an opening 18 therein permitting flow of gas through the plate. Such opening may be in the form of an annular kerf through the plate or a series of spaced perforations therein. The size of the opening 18 regulates the rate of gas flow upwardly through the plate. The lift gas supply line 19 discharges into the annular space between the barrier 13a and the feeder pipe 11 and below the plate 17. The gas thus admitted is proportioned by the size of the opening 18 as to the respective amounts flowing upwardly through the plate and downwardly towards the catalyst surface 14. In this arrangement there is no flow of gas downwardly through the bed of catalyst surrounding the barrier 13a. The downwardly flowing gas passes through the frusto-conical surface 14 and up into the feeder pipe 11 as in the embodiment previously described, while the additional lift gas supplied to the principal lift conduit 7 to engage the stream of catalyst discharged from the feeder pipe 11 thereinto, is supplied in predetermined amount through the opening 18 in plate 17.

In the modification illustrated in Figure 4 no feeder pipe is employed and the catalyst is supplied directly from the hopper 5 into the bottom of the lift conduit 7. The construction and operation of this embodiment is similar to that described in Figure 2, except that the barrier 13 now surrounds the lower portion of the lift pipe proper instead of a separate feeder pipe. Where catalyst from the hopper is fed directly into the lift pipe or into a feeder pipe transporting the same to the lift pipe, it may be desirable to provide means for preventing possible rubbing of the catalyst on the periphery of the inlet to the pipe, or on the inside of the lift pipe immediately above the lift entrance. Such means as illustrated in Fig. 4 is in the form of a sleeve or housing 20 surrounding the lift pipe and terminating at or near the bottom of the lift pipe. The top of the sleeve 20 is closed while the bottom thereof is open so that gas admitted through an inlet 21 passes into the annular space between the sleeve and the lift pipe and downwardly through such space to the bottom of the lift pipe, passing under and around the bottom periphery thereof into the lift pipe, thus providing a flowing stream protecting the bottom of the lift pipe. This form of sleeve may be employed not only in the case of the modification shown in Fig. 4 but in connection with the use of a feeder pipe as illustrated in Figs. 2 and 3.

In the embodiment illustrated in Fig. 5 a plurality of narrow feeder pipes are employed arranged in a circular pattern around the center coincident with the longitudinal axis of the lift pipe 7 and radially spaced from such center so as to provide a gas-passing space between the inner wall of the lift pipe 7 and the outermost parts of the walls of the feeder pipes. As illustrated in this figure, the feeder pipes 22 pass beyond the top of the hopper 5 through openings provided therein and for a short distance into the lower part of the lift pipe 7, leaving a space 23 between the wall of lift pipe 7 and the feeder pipes. As in the previously described embodiments the catalyst entering the hopper 5 through conduit 4 flows around the barrier 13, which in this instance surrounds the circular pattern of the plurality of feeder pipes 22. At the bottom of barrier 13 the catalyst flows inwardly from the periphery of the barrier towards the pattern of feeder pipes and intersects the circle circumscribing the feeder pipes to provide the sloping surface 14 through which gas is admitted. The gas is introduced into the hopper from the inlet 15 and passes downwardly within the cylindrical barrier 13 to engage the frusto-conical surface of catalyst 14 and then passes upwardly into the feeder pipes 22 carrying with it catalyst engaged thereby. In this instance gas and catalyst are uniformly distributed to all of the feeder pipes. Because of the small diameter of these feeder pipes, the difference in catalyst level around the periphery thereof is negligible and will have no significant adverse effect on the flow pattern of the catalyst entering the mouth of the feeder pipe. The feeder pipes 22 discharge as a plurality of separate streams into the lift pipe 7 and these streams are engaged by upwardly moving gas admitted to the lift pipe 7 through inlet 16.

The angle of repose of the granular material in the hopper 5 will depend upon the size and flow characteristics of the material. Granular materials with which the invention is more particularly concerned (such as those having a bulk density in the order of 40 to 70 pounds per cubic foot and having an average and predominant size range of from about 2 to 5 mm., in the form of cylindrical pellets or spherical or spheroidal beads and including such materials as natural clay and synthetic silica alumina) will assume a normal angle of repose in the order of from about 28 to about 38 degrees to the horizontal. In order that the inlet to the lift pipe or feeder pipe, as the case may be, be submerged in the layer of catalyst lying below the barrier, the vertical distance between the bottom of the lift pipe or feeder and the bottom of the barrier should be such that the angle formed with the horizontal by a line connecting the bottom of the barrier with the bottom of the lift pipe or feeder is substantially greater than the angle of repose of the catalyst. Accordingly with granular material of the type described, it is preferred to have the bottom of the barrier spaced vertically above the bottom of the lift path a distance of at least 0.8 times the horizontal distance between the barrier and the outer periphery of the lift path. Since the angle of repose of the catalyst may change somewhat during operation as the result of physical changes in the catalyst, it is advantageous to provide a vertical height between the bottom of the barrier and the bottom of the lift path equal to the tangent of an angle of about 45 degrees; in other words, the vertical distance is at least equal to the horizontal distance between the barrier and the lift path.

To obtain the desired flow pattern and distribution of catalyst at the inlet to the lift path and in the bottom portion of the lift path by the use of lift gas admitted downwardly through the bed of catalyst surrounding the lift path, a sufficient surface area of the catalyst must be engaged by the downflowing gas adjacent the lift entrance. This is readily assured in arrangements wherein the barrier terminates at a substantial height above the lift inlet, by lateral spreading of the lift gas into the bed in its path towards the lift inlet and below the bottom edge of the barrier. Even in arrangements wherein that height is relatively quite small as compared with the diameter of the lift inlet, adequate surface of contact of catalyst by the gas is assured by ample lateral spacing between the barrier and the lift pipe or feeder, such that the cross-section of the annular path traversed by the downwardly flowing gas through the catalyst bed is substantially equal to or preferably in excess of the cross section of the lift inlet, whether that inlet be the lift pipe itself or one or more feeders discharging into the lift pipe.

In all of the embodiments illustrated in the accompanying drawings the lift gas passes downwardly through a bed of contact mass and then reverses direction below the level of the lift path inlet to pass upwardly into the lift path. It will be understood, however, that the invention is equally applicable to lift inlet systems wherein additional means of supplying supplementary gas are employed, such as a discharge jet or diffuser nozzle located below the mouth of the lift and discharging gas upwardly through the bed, provided that the major portion of the lift gas is supplied by downward passage through the top of the bed.

Obviously many modifications and variations of the invention as hereinbefore set forth may be made without departing from the spirit and scope thereof and therefore only such limitations should be imposed as are indicated in the appended claims.

I claim as my invention:

1. In a system for pneumatic elevation of granular materials comprising a pressure-tight gas-engaging hopper closed at the top and bottom and provided with inlet means for the granular material at one side thereof, whereby said granular material fed to said hopper is caused to form a bed therein having its upper level sloping from the inlet side to the opposite side of said hopper; a lift conduit having its bottom closed by and extending upwardly from the top of said hopper; an open-ended upright solids feeder pipe of narrower dimension than said conduit passing upwardly through the top of the hopper into said conduit and terminating therein at a level above the bottom of said conduit, the lower end of said feeder pipe terminating at a level above the bottom of said hopper; a vertically disposed open-ended solids-deflecting cylindrical barrier surrounding said feeder pipe and horizontally spaced from the outer periphery thereof, the bottom of said barrier being spaced vertically above the lower end of said feeder pipe a distance of at least 0.8 times the horizontal distance between the barrier and the outer periphery of said pipe, and means for introducing lift gas into said hopper for downward flow through the interior of said barrier into the bed of solids lying below said barrier, and separate gas inlet means associated with said lift conduit for directly supplying gas thereto at a level below the top of said feeder pipe.

2. In a pneumatic lift system for granular material including an upright elongated lift pipe, a lift hopper at the lower end of said lift pipe, and feeder means comprising at least one vertical pipe extending from the bottom region of said hopper into the bottom region of said lift pipe for conveying granular material therebetween, the combination therewith of: a relatively-short cylindrical barrier surrounding an intermediate portion of said feeder means and providing an annular passage therebetween having a cross-sectional area at least equal to the total cross-sectional area of said feeder means, the lower ends of said feeder means being spaced below the lower end of said barrier a vertical distance of at least eighty percent of the horizontal distance between said barrier and said feeder means; inlet means for introducing granular material into said hopper at a level such that a compact moving bed of granular material partially filling said hopper and contiguous to said inlet means has an annular exposed upper surface which intersects the outer periphery of said barrier at a level substantially above its lower end, the portion of said bed which flows inwardly below the lower perimeter of said barrier having an exposed surface which intersects said feeder means a substantial distance above its lower end; means for introducing lift gas into the upper end of said annular passage; and means for introducing additional lift gas into the bottom of said lift pipe at a level below the upper end of said feeder means.

3. Apparatus as defined in claim 2, in which said feeder means comprises a uniformly-distributed grouped plurality of pipe sections extending axially upward into the lower end of said lift pipe.

4. Apparatus as defined in claim 3, in which said barrier has an open upper end extending above said inclined surface of the compact moving bed and communicating with the upper region of said hopper, and said first-mentioned lift gas is introduced initially into said upper region of said hopper.

5. Apparatus as defined in claim 2, in which said barrier is a longitudinal extension of the lower end portion of said lift pipe, and including a perforate horizontal annular plate member forming a partition separating said particle-free space from the bottom region of said lift pipe.

6. Apparatus as defined in claim 5, in which said means for introducing said first-mentioned lift gas comprises a laterally extending gas supply conduit communicating directly with the upper region of said particle-free space, and said means for introducing additional gas into the bottom region of said lift pipe comprises the perforations in said annular plate member.

7. Apparatus as defined in claim 2, in which the upper wall of said hopper forms a bottom closure for said lift pipe, said barrier is in open communication at its upper end with the space within said hopper above said inclined surface of the bed and at its lower end with an internal region of said bed, and said first-mentioned lift gas is introduced directly into said space above the inclined surface of said bed.

References Cited in the file of this patent

UNITED STATES PATENTS

| | | |
|---|---|---|
| 528,417 | Duckham | Oct. 30, 1894 |
| 528,418 | Duckham | Oct. 30, 1894 |
| 2,328,240 | Wiegand | Aug. 31, 1943 |

FOREIGN PATENTS

| | | |
|---|---|---|
| 82,016 | Switzerland | Oct. 16, 1919 |
| 180,397 | Great Britain | May 11, 1922 |
| 268,667 | Great Britain | Apr. 7, 1927 |